US006281316B1

(12) United States Patent
Wasserman et al.

(10) Patent No.: US 6,281,316 B1
(45) Date of Patent: Aug. 28, 2001

(54) ENHANCED CROSSLINKING TERPOLYMER

(75) Inventors: Scott Hanley Wasserman, Bridgewater; James LaMonte Adams, Somerset; Tong Chen, Neshanic Station; George Norris Foster, Bloomsburg; Laurence Herbert Gross, Bridgewater, all of NJ (US); Day-Chyuan Lee, Doylestown, PA (US); Walter Thomas Reichle, Warren; Robert Harold Vogel, Ringoes, both of NJ (US)

(73) Assignee: Union Carbide Chemicals & Plastics Technology Corporation, Danbury, CT (US)

( * ) Notice: Subject to any disclaimer, the term of this patent is extended or adjusted under 35 U.S.C. 154(b) by 0 days.

(21) Appl. No.: 09/273,609

(22) Filed: Mar. 22, 1999

(51) Int. Cl.$^7$ ............................ C08F 36/20; C08F 210/18
(52) U.S. Cl. .................... 526/282; 526/284; 526/336; 526/339; 526/340.3; 526/348.5; 526/348.6; 526/916
(58) Field of Search ................. 526/348.2, 348.6, 526/336, 339, 340.3, 348.5, 916, 282, 284

(56) References Cited

U.S. PATENT DOCUMENTS

| 5,240,983 | 8/1993 | Tabata et al. ......................... 524/261 |
| 5,527,752 | 6/1996 | Reichle et al. ........................ 502/117 |
| 5,539,075 | 7/1996 | Gustafsson et al. .................. 526/339 |
| 5,552,482 | 9/1996 | Berta ........................................ 525/88 |
| 5,571,883 | 11/1996 | Jourdain et al. ...................... 526/282 |
| 5,656,693 | 8/1997 | Ellul et al. ............................ 525/171 |
| 5,798,427 | * 8/1998 | Foster et al. ......................... 526/352 |

FOREIGN PATENT DOCUMENTS

| WO 93/08222 | 4/1993 | (WO) . |
| WO 96/12744 | 5/1996 | (WO) . |
| WO 97/00523 | * 1/1997 | (WO) . |
| WO 97/00288 | 1/1997 | (WO) . |

OTHER PUBLICATIONS

Journal of Polymer Science: Polymer Chemistry Ed., Kaminsky et al., "Ethylene Propylene Diene Terpolymers Produced with a Homogeneous and Highly Active Zirconium Catalyst", vol. 23, 1985, pp 2151 to 2164.
Rubber Chemistry and Technology, Cartasegna, "Silane–Grafted/Moisture–Curable Ethylene–Propylene Elastomers for the Cable Industry", vol. 59, 1986, pp 722–739.

* cited by examiner

*Primary Examiner*—David W. Wu
*Assistant Examiner*—R. Harlan

(57) ABSTRACT

A polymer of the invention comprising the comonomers ethylene, one or more alpha-olefins having 3 to 20 carbon atoms, and one or more cyclic dienes having up to 30 carbon atoms, said polymer having a density of at least 0.890 gram per cubic centimeter; long chain branching; a plurality of double bonds; an Mw/Mn ratio ratio (PDI) of at least 2.5; a flow activation energy of greater than about 6.5 kcal/mol; and a Relaxation Spectrum Index (RSI), PDI, and Melt Index (MI), such that $RSI \cdot MI^a > 2.7$ and $RSI \cdot MI^a \cdot PDI^b$ is in the range of about 0.8 to about 60, when a and b are about 0.6 and minus 1.2, respectively.

11 Claims, No Drawings

ENHANCED CROSSLINKING TERPOLYMER

TECHNICAL FIELD

This invention relates to a terpolymer, which is easily processed and contains stabilized unsaturation, which enhances crosslinking.

BACKGROUND INFORMATION

In a gas-phase polymerization process, traditional Ziegler-Natta catalysts have been shown to readily polymerize ethylene with one or more higher alpha-olefin comonomers such as propylene, 1-butene, 1-pentene, 1-hexene, 4-methyl-1-pentene, 1-octene and 3,5,5-trimethyl-hexene, to produce a linear low-density polyethylene (LLDPE) with minimal if any long-chain branching (LCB). The increasing development of metallocene catalyzed olefin polymers has resulted in the ability to produce similar polymers with a more well-defined molecular structure than can be achieved with conventional Ziegler-Natta catalysts . Metallocene linear low density polyethylenes made according to U.S. Pat. Nos. 5,420,220 and 5,324,800, for example, possess narrow comonomer and molecular weight distributions. U.S. Pat. Nos. 5,527,752 describes further a family of metallocene catalyst precursors which are useful, when combined with a cocatalyst or catalyst activator, in the manufacture of polyolefins.

The various linear low density polyethylenes referred to above are known to be useful, among a wide variety of applications, in those applications in which a crosslinkable polymer is required.

In this vein, industry has been seeking polymers, which have improved crosslinking properties without sacrificing processability.

DISCLOSURE OF THE INVENTION

An object of this invention, therefore, is to provide a polymer, which is easily processed and contains stabilized double bonds useful in applications where crosslinking is of substantial importance.

According to the present invention, such a polymer has been discovered. The polymer of the invention is comprised of the comonomers ethylene, one or more alpha-olefins having 3 to 20 carbon atoms, and one or more cyclic dienes having up to 30 carbon atoms, said polymer having a density of at least 0.890 gram per cubic centimeter; long chain branching; a plurality of double bonds; an Mw/Mn ratio (PDI) of at least 2.5; a flow activation energy of greater than about 6.5 kcal/mol; and a Relaxation Spectrum Index (RSI), PDI, and Melt Index (MI), such that $RSI \cdot MI^a > 2.7$ and $RSI \cdot MI^a \cdot PDI^b$ is in the range of about 0.8 to about 60, when a and b are about 0.6 and minus 1.2, respectively.

DESCRIPTION OF THE PREFERRED EMBODIMENTS

The addition of a cyclic diene comonomer (CDC) with ethylene and a higher alpha-olefin comonomer in a gas-phase reactor provides a mechanism by which long-chain branching can be introduced into the polymer. In norbornadiene (NBD), for example, both double bonds in its cyclic structure are strained due to the molecular geometry causing them to be very reactive during the gas-phase polymerization process. For this reason, NBD is readily incorporated into a growing polymer chain at one of the double bonds. Subsequent re-incorporation of the second double bond into a growing polymer chain occurs somewhat less frequently, though when it does occur, the result is that a 4-arm star or similar LCB structure is formed as long as the concentration of the cyclic diene is kept to some low level in the process (see structures 2 and 4). If the second double bond is not re-incorporated, the double bond remains as residual unsaturation when the polymer is continuously removed from the reactor (see structures 1 and 3).

The long chain branches are described as being at least about 250 carbon atoms in length. One of the characteristics of long chain branches is that they become entangled in the melt state, so they can also be described as being at least as long as the entanglement molecular weight of about 3800 Daltons since that corresponds to the minimum chain length required to be recognized by the melt rheological properties of polyethylene (See Ferry, *Viscoelastic Properties of Polymers*, John Wiley & Sons, 1980, pages 243 and 378).

Structures 1, 2, 3, and 4 are as follows (when the cyclic diene comonomer is NBD):

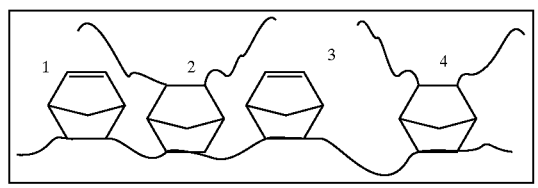

Stabilization of that residual unsaturation provides preferred structures for subsequent cross-linking (e.g., by a wire or cabling manufacturer) such that less cross-linking agent, such as an organic peroxide, needs to be used relative to cross-linking of a polymer with less residual unsaturation. 4-arm star LCB or similar moieties provide enhanced rheological behavior that will lead to easier extrusion and superior melt strength relative to polymers without those structures.

Examples of typical cyclic dienes are as follows:

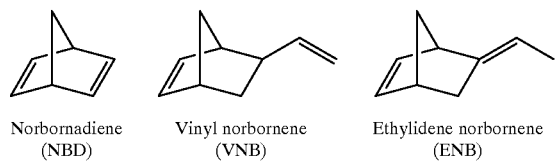

| Norbornadiene (NBD) | Vinyl norbornene (VNB) | Ethylidene norbornene (ENB) |

Vinyl norbornene (VNB) has one double bond within the cyclic portion of its structure that is strained on an atomic level, and a second double bond as part of a pendant vinyl structure. The strained nature of the former double bond makes it far more reactive than the latter, such that incorporation of VNB into a growing polymer chain will occur via the strained location. In fact, the pendant vinyl group may be less reactive in the gas-phase reactor than the alpha-olefin, therefore the probability of cross-linking is even lower than that with NBD. It will, however, remain readily available for cross-linking.

Ethylidene norbornene (ENB) has a structure that is similar to that of VNB, though the double bond that is not within the cyclic comonomer structure is not as readily available for re-incorporation as it is in the pendant vinyl structure of VNB. As in the case of VNB, incorporation of ENB into a growing polymer chain will occur at the strained double bond that is part of the cyclic portion of its structure. The probability for re-incorporation of the second double bond is lower than that in both NBD and VNB, but it will still be readily available for cross-linking.

This invention describes polyolefin products made in a gas-phase reactor by the polymerization of ethylene with at least one higher alpha-olefin comonomer and at least one CDC such that some of the unsaturation that results from the initial incorporation of the CDC is re-incorporated into another growing chain to form LCB and some of the unsaturation remains following the reaction.

Polymers of this invention include copolymers of ethylene with at least one linear or branched higher alpha-olefin containing 3 to about 20 carbon atoms and at least one cyclic diene comonomer that may be produced in the gas phase in a mechanically stirred or gas-fluidized bed reactor using equipment and procedures well known in the art. The densities range from 0.890 to 0.965 gram per cubic centimeter with melt indices from about 0.1 to about 200 grams per 10 minutes, in accordance with ASTM D1238, condition E, at 190 ° C. Suitable higher alpha-olefins, linear and branched, include, for example, propylene, 1-butene, 1-pentene, 1-hexene, 4-methyl-1-pentene, 1-octene and 3,5,5-trimethyl-hexene. Suitable cyclic diene comonomers include, but are not limited to, norbornadiene, vinyl norbornene, and ethylidene norbornene. A cyclic diene comonomer can have a structure that is mono-cyclic, bi-cyclic, or otherwise multi-cyclic. Further, a cyclic diene comonomer can have a structure in which both double bonds are internal to the ring structure, one of the double bonds can be exocyclic, or both double bonds can be exocyclic. Further, when one of the double bonds is exocyclic, the cyclic diene comonomer can have, but is not limited to, the following molecular structure:

where n=0→∞. In a preferred embodiment, n=0→20.

The polymers of this invention have polydispersity indices greater than 2.5, preferably greater than about 3.0. The polydispersity index (PDI) of a polymer is defined as the ratio of the weight average molecular weight of the polymer to the number average molecular weight of the polymer (Mw/Mn). PDI, uncorrected for long chain branching, is determined using size exclusion chromatography (SEC) with a WATERS™ 150 degrees C. GPC instrument operating at 140 degrees C. with 1,2,4-trichlorobenzene at a flow rate of 1 milliliter per minute. The pore size range of the column set provides for a molecular weight separation covering the 200 to 10,000,000 Daltons range. National Institute of Standards Technology polyethylene standard NBS 1475 is used as the calibration standard to obtain the uncorrected (linear polymer assumed) molecular weight distribution.

The polymers of the invention have unique rheological properties that suggest distinct molecular structure which imparts superior extrusion performance and stabilized residual unsaturation that will lead to efficient cross-linking. The unique rheological properties also favor relative fabrication ease especially in extrusion. In particular, the ethylene polymers have melt indices (MI), polydispersity indices (PDI), and Relaxation Spectrum Indices (RSI) such that, for a given ethylene polymer:

RSI*MI$^a$>2.7, and 0.8<RSI*MI$^a$*PDI$^b$<60, where a and b are about 0.6 and minus 1.2, respectively.

Preferably,

RSI*MI$^a$>3.0, and 1.1<RSI*MI$^a$*PDI$^b$<35, where a and b are about 0.6 and minus 1.2, respectively.

In the formulae immediately above, MI is the melt index of the polymer reported as grams per 10 minutes, determined in accordance with ASTM D1238, condition E, at 190° C., and RSI is the Relaxation Spectrum Index of the polymer, a dimensionless parameter. The quantities RSI·MI$^a$ and RSI·MI$^a$·PDI$^b$, where a and b are about 0.6 and minus 1.2, respectively, are referred to herein as nRSI and cRSI, respectively. Whereas RSI is sensitive to measures of molecular structure such as MI, PDI, LCB, and cross-linking, nRSI is sensitive to measures of molecular structure such as PDI, LCB, and cross-linking and cRSI is sensitive to measures of molecular structure such as LCB and cross-linking.

The RSI of the ethylene polymer is determined by first subjecting the polymer to a shear deformation and measuring its response to the deformation using a rheometer. As is known in the art, based on the response of the polymer and the mechanics and geometry of the rheometer used, the relaxation modulus G(t) or the dynamic moduli G'(w) and G"(w) may be determined as functions of time t or frequency w, respectively (See Dealy et al, *Melt Rheology and Its Role in Plastics Processing*, Van Nostrand Reinhold, 1990, pages 269 to 297). The mathematical connection between the dynamic and storage moduli is a Fourier transform integral relation, but one set of data can also be calculated from the other using the well known relaxation spectrum (See Wasserman, *J. Rheology*, Vol. 39, 1995, pages 601 to 625). Using a classical mechanical model, a discrete relaxation spectrum consisting of a series of relaxations or "modes", each with a characteristic intensity or "weight" and relaxation time, can be defined. Using such a spectrum, the moduli are re-expressed as:

$$G'(\omega) = \sum_{i=1}^{N} g_i \frac{(\omega \lambda_i)^2}{1+(\omega \lambda_i)^2}$$

$$G''(\omega) = \sum_{i=1}^{N} g_i \frac{\omega \lambda_i}{1+(\omega \lambda_i)^2}$$

$$G(t) = \sum_{i=1}^{N} g_i \exp(-t/\lambda_i)$$

where N is the number of modes and gi and l$_i$ are the weight and time for each of the modes (See Ferry, *Viscoelastic Properties of Polymers*, John Wiley & Sons, 1980, pages 224 to 263). A relaxation spectrum may be defined for the polymer using software such as IRIS™ rheological software, which is commercially available from IRIS Development. Once the distribution of modes in the relaxation spectrum is calculated, the first and second moments of the distribution, which are analogous to M$_n$ and M$_w$, the first and second moments of the molecular weight distribution, are calculated as follows:

$$g_I = \sum_{i=1}^{N} g_i \bigg/ \sum_{i=1}^{N} g_i / \lambda_i$$

$$g_{II} = \sum_{i=1}^{N} g_i \lambda_i \bigg/ \sum_{i=1}^{N} g_i$$

RSI is defined as gII/gI.

Because RSI is sensitive to such parameters as a polymer's molecular weight distribution, molecular weight, and long chain branching, it is a sensitive and reliable indicator of the stress relaxation of a polymer. The higher the value of RSI, the broader the relaxation time distribution of the polymer.

An additional rheological indicator of relative fabrication ease in extrusion is the flow activation energy, Ea. In particular, the ethylene polymers of the current invention have flow activation energies, Ea, such that, for a given ethylene polymer:

Ea>6.5 kcal/mol.
Preferably,
Ea>7.0 kcal/mol.

The flow activation energy, Ea, is calculated from dynamic oscillatory shear data collected on the same sample but at different experimental temperatures. The shift in the experimental data along the frequency axis relative to the experimental data at some reference temperature, typically 190 degrees C., is calculated. The set of temperature shift, $a_T$, and temperature data are then fit to an Arrhenius expression, $$a_T = \exp\left[\frac{E_a}{R}\left(\frac{1}{T+273.15} - \frac{1}{T_0+273.15}\right)\right]$$

where T and $T_O$ are the experimental and reference temperatures, respectively, in degrees C., and R is the ideal gas constant (see Dealy et al, *Melt Rheology and Its Role in Plastics Processing*, Van Nostrand Reinhold, 1990, page 383). The flow activation energy, Ea, is calculated from the fit of the temperature shift and temperature data to the above expression.

Polymerization is preferably conducted in the gas phase in a stirred or fluidized bed reactor using equipment and procedures well known in the art. Above atmospheric pressures in the range of about 1 to about 1000 psig, preferably about 50 to about 400 psia, and most preferably about 100 to about 300 psia, and temperatures in the range of about 30 to about 130 degrees C., preferably 65 to 110 degrees C. are used. Ethylene and other monomers, if used, are contacted with an effective amount of catalyst composition at a temperature and a pressure sufficient to initiate polymerization.

Catalyst compositions used to produce the olefin polymers of the current invention can be introduced into the reactor system with the active material impregnated onto an inert support typically made of alumina or silica. Such catalysts, hereafter referred to as supported catalysts, are more fully described in, for example, United States patents 3,779,712; 3,876,602; and 3,023,203. The catalysts used to produce the olefin polymers of the current invention can also be introduced into the reaction zone in liquid form, as described in United States patent 5,317,036. Such soluble olefin polymerization coordination catalysts, hereafter referred to as unsupported catalysts, are uniquely suitable to operate in gas phase reactions and offer a number of significant advantages. Such advantages include the avoidance of costs associated with the support material and its preparation, and the realization of a very high catalyst surface area to volume ratio. The catalyst solution delivered to the reaction zone comprises the catalyst dissolved in a suitable solvent and, if necessary, an activating cocatalyst in liquid form. Alternatively, the catalyst solution and activating cocatalyst can be introduced to the reaction zone separately. In the case of metallocene catalysts, the preferred activating cocatalyst is an aluminoxane that contains repeating units of the general formula:

where n=3→50 and R is an alkyl group such as methyl or isobutyl. Alternative activating cocatalysts include borates, such as tripentafluorophenyl)borate, and the like. Most preferred activating cocatalysts include methyl aluminoxane (MAO) or modified methylaluminoxane ( MMAO), the latter of which comprises a majority of MAO with a minority fraction of iso-butyl aluminoxane (iBAO).

Suitable catalyst precursors that may be used to produce the olefin polymers of the current invention include a novel family of materials comprising complexes of transition metals, substituted or unsubstituted pi-bonded ligands, and heteroallyl moieties. Preferred embodiments of such a family of catalysts include zirconium or hafnium as the transition metal, a cyclopentadienyl-type ligand, and disubstituted carbamate or carboxylate substituents. Particularly preferred embodiments of the novel family of catalysts are the mono-indenyl zirconium tris(diethylcarbamate) and mono-indenyl zirconium tris(pivalate) catalysts. Other suitable catalyst precursors for use in the current gas-phase process include derivatives of mono, bis, and tricyclopentadienyl coordination complexes with a transition metal such as those described in U.S. Pat. Nos. 4,542,199 and 5,324,800, and European Patent 250,601-B1. Other transition metal catalyst systems, which can be used to prepare the terpolymer, are magnesium/titanium based catalyst systems, which can be exemplified by the catalyst system described in U.S. Pat. No. 4,302,565; vanadium based catalyst systems such as those described in U.S. Pat. Nos. 4,508,842; 5,332,793; 5,342,907; and 5,410,003; a chromium based catalyst system such as that described in U.S. Pat. No. 4,101,445. Many of these catalyst systems are often referred to as Ziegler-Natta catalyst systems. Catalyst systems, which use chromium or molybdenum oxides on silica-alumina supports, are also useful.

Suitable gas phase polymerization reaction systems comprise a reactor to which monomer(s) and catalyst composition can be added. A typical fluidized or stirred bed reactor contains a bed of forming polyethylene particles. The invention is not limited to any specific type of gas phase reaction system. As an example, a conventional fluidized bed process is conducted by passing a gaseous stream containing one or more monomers continuously through a fluidized bed reactor under reaction conditions and in the presence of catalyst composition at a velocity sufficient to maintain the bed of solid particles in a suspended condition or to pass a stream of gas bubbles through a bed. The gaseous stream containing unreacted gaseous monomer is withdrawn from the reactor continuously, compressed, cooled, and recycled into the reactor. Product is withdrawn from the reactor and make-up monomer is added to the recycle stream.

When hydrogen is used as a chain transfer agent in the process, it is used in amounts varying between about 0.001 to about 10 moles of hydrogen per mole of total monomer feed. Also, as desired for temperature control of the system, any gas inert to the catalyst composition and reactants can also be present in the gas stream.

Organometallic compounds can be employed as scavenging agents for poisons to increase the catalyst activity.

Examples of these compounds are metal alkyls, preferably aluminum alkyls, most preferably tri-isobutyl aluminum or tri-n-hexyl aluminum. Use of such scavenging agents is well known in the art.

The olefin polymers from the reaction process can be blended with other polymers and resins using techniques known in the art. In addition, various additives and reagents can be mixed with the olefin polymers of the invention. Conventional additives can be included in the reaction process, provided they do not interfere with the function of the catalyst. Specifically, additional thermo- and photo-oxidation stabilizers including hindered phenolic and hydroxy amino antioxidants, hindered amine light stabilizers, thioesters or disulfide and aryl phosphites or phosphonites can be added. To meet specialized product requirements, cross-linking reagents including dicumyl peroxide, colorants including carbon blacks and titanium dioxide, lubricants including metallic stearates, processing aids including fluoroelastomers, slip agents including oleamide or erucamide, antiblock or release agents including stearamide, ethylene bis-stearamide, and controlled particle size zeolite, calcium carbonate, talc or silica, blowing agents, flame retardants and other conventional materials can also be mixed with the olefin polymer and their mixtures with other resins. The additives can be added to the polymer either before or during processing. More useful additives are antioxidants, ultraviolet absorbers, antistatic agents, pigments, carbon black, dyes, fillers, slip agents, fire retardants, plasticizers, processing aids, lubricants, stabilizers, smoke inhibitors, halogen scavengers, flow aids, lubricants, water tree inhibitors such as polyethylene glycol, and viscosity control agents. Aside from the fillers, the additives can be present in the blend in amounts of about 0.02 to about 10 parts by weight of additive for each 100 parts by weight of polymer blend. Fillers can be added in amounts of up to 200 parts by weight and more for each 100 parts by weight of the blend.

The olefin polymers of the invention are useful for fabrication into a variety of finished articles such as films including shrink films, extrusion coatings, wire and cable insulation and jacketing, cross-linked power cable insulation, molded articles made by injection molding, blow molding, or rotational molding, extrusions of pipe, tubing, profiles and sheeting, and semiconductive insulation and jacketing. Methods of making such articles are well known in the art.

The polymers can be processed in various types of extruders, e.g., single or twin screw types. A description of a conventional extruder can be found in U.S. Pat. No. 4,857,600. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. In the alternative, there can be multiple heating zones (more than two) along the axis running from upstream to downstream. If it has more than one barrel, the barrels are connected in series. The length to diameter ratio of each barrel is in the range of about 15:1 to about 30:1. For the purposes of this specification, it will be understood that the term "extruder" includes, in addition to conventional extruders, the combination of an extruder, crosshead, die, and a heating or cooling zone where a further forming of the material can be accomplished. The heating or cooling follows the die and may be, for example, an oven. In wire coating, where the material is crosslinked after extrusion, the die of the crosshead feeds directly into a heating zone, and this zone can be maintained at a temperature in the range of about 130 to about 260 degrees C., and preferably in the range of about 170 to about 220 degrees C.

The extrudate can be crosslinked by irradiation or with a crosslinking agent such as an organic peroxide. In the case of the peroxide, by exposing the extrudate to a temperature greater than the decomposition temperature of the organic peroxide. Preferably, the peroxide employed is decomposed through four or more half-lives. The crosslinking can be accomplished in, for example, an oven or a continuous vulcanizable (CV) tube. With steam CV equipment, a pressure rated vulcanizing tube is mechanically coupled to the extruder crosshead such that the polymer melt exits the crosshead/die assembly into a vulcanizing pipe running perpendicular to the extruder. In a typical CV operation, compositions incorporating peroxides are extrusion fabricated into insulation and cable jacketing at low melt extrusion temperatures to avoid premature crosslinking in the extruder. The fabricated melt shape exits the shaping die into the steam vulcanizing tube where post extrusion peroxide initiated crosslinking occurs. The steam tube is filled with saturated steam which continues to heat the polyolefin melt to the increased temperatures needed for crosslinking. Most of the CV tube is filled with saturated steam to maximize dwell time for crosslinking to occur. The final length before exiting the tube is filled with water to cool the now crosslinked insulation/jacketing. At the end of the CV tube, the insulated wire or cable passes through an end seal incorporating close fitting gaskets, which minimize the cooling water leakage. Steam regulators, water pumps, and valves maintain equilibrium of the steam and water and the respective fill lengths within the steam CV tube.

Examples of antioxidants are: hindered phenols such as octadecyl 3-(3,5-di-tert-butyl-4-hydroxyphenyl)-propionate, tetrakis[methylene(3,5-di-tert-butyl-4-hydroxyhydro-cinnamate)]methane, bis [(beta-(3,5-di-tert-butyl-4-hydroxybenzyl)-methylcarboxyethyl)]sulfide, 4,4'-thiobis(2-tert-butyl-5-methylphenol), 2,2'-thiobis(4-methyl-6-tert-butylphenol), and thiodiethylene bis(3,5-di-tert-butyl-4-hydroxy hydrocinnamate); phosphites and phosphonites such as tris(2, 4-di-tert-butylphenyl)phosphite, tris (nonylphenyl)phosphite and di-tert-butylphenyl-pentaerythrityl-phosphonite; thio compounds such as dilaurylthiodipropionate, dimyristylthiodipropionate, and distearylthiodipropionate (DSTDP); various siloxanes; and various amines such as polymerized 2,2,4-trimethyl-1,2-dihydroquinoline, 4,4'-bis(alpha, alpha-dimethylbenzyl) diphenylamine, and alkylated diphenylamines. Antioxidants can be used in amounts of about 0.02 to about 5 percent by weight based on the weight of the composition.

It is understood that a portion of the double bonds are stabilized by use of an additives package, which includes one or more of the above antioxidants or stabilizers, in combination with the defined polymer. A preferred stabilization package can be described as follows: 1200 parts per million as tris(2, 4-di-tert-butylphenyl)phosphite and 300 parts per million octadecyl 3-(3,5-di-tert-butyl-4-hydroxyphenyl)-propionate. The package is introduced after the polymer has been purged of any residual monomers or other reactor components and prior to extrusion compounding, pelleting, or other post-reactor treatment of the polymer. The concentration of residual double bonds, i.e., stabilized double bonds, which remain until the curing step, can be about 0.01 to about 3 percent by weight, preferably to about 2 percent, based on the weight of the polymer.

The organic peroxides mentioned above preferably have a decomposition temperature of 100 to 220 degrees C. for a half-life of 10 minutes. They can be exemplified by the following compounds [the numbers set off by the parentheses are their decomposition temperatures (in degrees C.)]: succinic acid peroxide (110), benzoyl peroxide (110), t-butyl peroxy-2-ethyl hexanoate (113), p-chlorobenzoyl peroxide (115), t-butyl peroxy isobutylate (115), t-butyl peroxy isopropyl carbonate (135), t-butyl peroxy laurate (140), 2,5-dimethyl-2,5-di(benzoyl peroxy)hexane (140), t-butyl peroxy acetate (140), di-t-butyl diperoxy phthalate (140), t-butyl peroxy maleic acid (140), cyclohexanone peroxide (145), t-butyl peroxy benzoate (145), dicumyl peroxide (150), 2,5-dimethyl-2, 5-di(t-butyl-peroxy)hexane (155), t-butyl cumyl peroxide (155), t-butyl hydroperoxide (158), di-t-butyl peroxide (160), 2,5-dimethyl-2, 5-di(t-butyl peroxy)hexane-3 (170), and alpha, alpha'-bis-t-butylperoxy-1,4-diisopropylbenzene (160). Alpha, alpha'-bis-t-butylperoxy-1,4-diisopropylbenzene is sometimes preferred because of its high decomposition temperature although dicumyl peroxide is more commonly used.

The advantages of the invention are as follows: The residual unsaturation is in a stabilized state, which insures its availability to provide a highly efficient means for cross-linking the polymer with a peroxide or other cross-linking agent. The cross-linking process is made more efficient by requiring less cross-linking agent relative to a polymer without the residual unsaturation. The LCB structures provide preferred Theological behavior resulting in easier extrusion and enhanced melt strength, for example.

All molecular weights mentioned in this specification are weight average molecular weights unless otherwise designated.

Patents and publications mentioned in this specification are incorporated by reference herein.

The invention is illustrated by the following examples.

EXAMPLES

Measurements

Molecular Weights and Molecular Weight Distribution are determined by size exclusion chromatography as follows. A WATERS™ 150 degrees C. GPC chromatograph equipped with mixed-pore size columns for molecular weight measurements is employed. For the size exclusion chromatography (SEC), a 25 centimeter long preliminary column from Polymer Labs having a 50 Angstrom nominal pore size, followed by three 25 centimeter long Shodex™ A-80 M/S (Showa) columns to affect a molecular weight separation for linear ethylene polymer from about 200 to about 10,000,000 Daltons are used. Both columns contain porous poly (styrene-divinyl benzene) packing. 1,2,4, -trichlorobenzene is used as the solvent to prepare the polymer solutions and the chromatographic eluent. All measurements are made at a temperature of 140±0.2 degrees C. The analog signals from the mass and viscosity detectors are collected into a computer system. The collected data are then processed using standard software commercially available from several sources (such as Waters Corporation) for uncorrected molecular weight distribution. The calibration uses the broad MWD calibrant method. (See Yau et al, *Modern Size-Exclusion Liquid Chromatography*, Wiley, 1979, pages 289 to 313. For the latter, two MW related statistics such as number and weight average MW values must be known for the polymer calibrant. Based on the MW calibration, elution volume is converted to molecular weight for the assumed linear ethylene polymer.

Rheological measurements are done via dynamic oscillatory shear experiments conducted with a new model of the Weissenberg™ Rheogoniometer commercially available from TA Instruments. Standard experiments are run in parallel plate mode under a nitrogen atmosphere at 190 degrees C. Sample sizes range from approximately 1100 to 1500 microns and are 4 centimeters in diameter. The frequency sweep experiments cover a frequency range of 0.1 to 100 $sec^{-1}$ with a 2 percent strain amplitude. The torque response is converted by the TA Instruments rheometer control software to dynamic moduli and dynamic viscosity data at each frequency. Discrete relaxation spectra are fit to the dynamic moduli data for each sample using the IRIS™ commercial software package. For flow activation energy calculations, additional experiments are run at 2 to 3 additional temperatures in the range of 150 to 230 degrees C., with other experimental conditions being the same.

Density is measured according to ASTM test method D1505 (G-101).

EXAMPLES 1 to 35

Examples 1 to 7, 9 to 14, 15B to 19B, and 20 to 28 are embodiments of the invention . Examples 8, 15A to 19A, and 29 to 35 are comparative examples.

Examples 1 to 7 and 9 to 14 and comparative examples 8 and 29 to 32 are produced in a 1.8 liter stirred reactor at 85 degrees C. The catalyst and cocatalyst are injected at 85 degrees C. and 200 psi ethylene and the reaction is terminated by injection of isopropanol at the same temperature and pressure.

Examples 15B to 19B and comparative examples 15A to 19A, 33, and 34 are produced in a stirred bed, horizontally mixed 54.6 liter reactor. Ethylene partial pressure was 1.65 MPa and the reactor temperature was 85° C. The reactor was vented to terminate the reaction, and monomers were purged from the polyethylene resin with nitrogen.

Examples 20 to 28 and comparative example 35 are produced in a 14 inch nominal diameter, gas phase, fluidized bed reactor having a bed height of 10 feet.

The catalyst composition employed to make each of examples 1 to 4 and 15B to 19B and comparative examples 15A to 19A, 29, 33, and 34 is comprised of indenyl zirconium tris(diethylcarbamate) catalyst and modified methylaluminoxane activating cocatalyst. The catalyst composition employed to make each of examples 5 to 7 and comparative examples 8, 30 and 31 is comprised of methylcyclopentadienyl zirconium tris(pivalate) catalyst and modified methylaluminoxane activating cocatalyst. The catalyst composition employed to make each of examples 9 to 14 and 20 to 28 and comparative examples 32 and 35 is comprised of indenyl zirconium tris(pivalate) catalyst and modified methylaluminoxane activating cocatalyst.

Examples 1 to 4 are produced with 1.1 grams NBD per 200 milliliters of 1-hexene, with results listed below. Comparative example 29 is produced under similar conditions, but with no cyclic diene comonomer. Prior to testing, all samples are dry-blended with 2000 ppm of Irganox™ 1035 (Ciba) and pressed multiple times under non-severe conditions to promote dispersion without promoting any degradation in the samples. In addition to the PDI values increasing substantially with NBD addition and incorporation, RSI values are increased by 4.5 to 20 times. It is additionally shown that nRSI values show little variation among examples 1 to 4, but collectively remain 3 to 3.5 times greater than that for comparative example 29. It is additionally shown that cRSI values for examples 1 to 4 are 1.1 to 2.0 whereas that for comparative example 29 is 1.0. Further, it is shown that the flow activation energy, $E_a$, for example 4 is 50 percent greater than that for comparative example 29. See Table I.

TABLE I

| Examples | NBD (g/200 ml C6) | MI (g/10 min) | PDI | RSI | nRSI | cRSI | $E_a$ (kcal per mol) |
|---|---|---|---|---|---|---|---|
| 29 | 0 | 6.0 | 4.6 | 2.2 | 6.5 | 1.0 | 7.0 |
| 1 | 1.1 | 1.0 | 10.9 | 19.8 | 19.8 | 1.1 | — |
| 2 | 1.1 | 0.4 | 9.7 | 44.1 | 23.6 | 1.5 | — |
| 3 | 1.1 | 3.5 | 7.5 | 10.2 | 22.1 | 2.0 | — |
| 4 | 1.1 | 1.0 | 9.1 | 20.4 | 20.0 | 1.4 | 10.6 |

Examples 5 to 7 are produced with 2 to 8 grams VNB per 200 milliliters of 1-hexene with the results listed below. Comparative example 30 is produced under similar conditions, but with no cyclic diene comonomer. Prior to testing, all samples are dry-blended with 1500 ppm of Irganox™ B-900 (Ciba) and pressed multiple times under non-severe conditions to promote dispersion without promoting any degradation in the samples. Due to VNB addition and incorporation, RSI values for Examples 5 to 7 are 0.5 to 13 times greater than that for comparative example 30. Comparative examples 8 and 31 are produced with no 1-hexene added to the reactor vessel leading to the production of an ethylene-VNB copolymer and an ethylene homopolymer, respectively. Prior to testing, all samples are dry-blended with 1500 ppm of Irganox™ B-900 (Ciba) and pressed multiple times under non-severe conditions to promote dispersion without promoting any degradation in the samples. The RSI value for comparative example 8 is more than 50 times that of comparative example 31. See Table II.

TABLE II

| Examples | VNB (g/200 ml C6) | PDI | RSI |
|---|---|---|---|
| 30 | 0 | 2.6 | 6.0 |
| 5 | 2 | 3.7 | 13.0 |
| 6 | 4 | 3.1 | 10.0 |
| 7 | 8 | — | 83.1 |
| 31 | 0 (no 1-hexene) | — | 19.8 |
| 8 | 8 (no 1-hexene) | — | 1055.0 |

Examples 9 to 12 are produced with 2 to 16 grams VNB per 200 milliliters of 1-hexene with the results listed below. Prior to testing, all samples are dry-blended with 1500 ppm of Irganox™ B-900 (Ciba) and pressed multiple times under non-severe conditions to promote dispersion without promoting any degradation in the samples. Due to VNB incorporation, RSI values for examples 9 to 12 increase consistently and substantially with increasing VNB addition to the reactor. The RSI value for example 12 is about 26 times that of example 9. Further, the relaxation spectra for examples 10 to 13 show a consistent and substantial evolution with increasing VNB addition and incorporation. More specifically, increasing VNB addition and incorporation leads to an enhancement of the long-relaxation time regime of the relaxation spectrum including a consistent and substantial shift in the longest relaxation times to higher values. The longest relaxation time for example 12 is 12 times that of example 9. Further, the relaxation spectra for example 12 show no indication of cross-linking. See Table III.

TABLE III

| Examples | VNB (g/200 ml C6) | RSI | longest relaxation time (sec) |
|---|---|---|---|
| 9 | 2 | 7.9 | 14.4 |
| 10 | 4 | 17.4 | 40.9 |
| 11 | 8 | 28.7 | 43.0 |
| 12 | 16 | 205.0 | 173.6 |

Examples 13 and 14 are produced with 4.1 to 16.7 grams VNB 200 milliliters 1-hexene with the results listed below. Comparative example 32 is produced under similar conditions, but with no cyclic diene comonomer. Prior to testing, all samples are dry-blended with 1500 ppm of Irganox™ B-900 (Ciba) and pressed multiple times under non-severe conditions to promote dispersion without promoting any degradation in the samples. It is shown that examples 13 and 14 have higher Ea and cRSI relative to comparative example 32. See Table IV.

TABLE IV

| Examples | VNB (g/200 ml C6) | MI (g/10 min) | PDI | RSI | nRSI | cRSI | Ea (kcal/mol) |
|---|---|---|---|---|---|---|---|
| 32 | 0 | 1.7 | 33.6 | 6.9 | 9.5 | 0.1 | 6.4 |
| 13 | 4.1 | 1.4 | 6.9 | 7.2 | 8.9 | 1.1 | 6.7 |
| 14 | 16.7 | 0.2 | 4.3 | 26.6 | 10.0 | 1.7 | 6.9 |

Examples 15B to 19B and comparative examples 15A to 19A are produced with 0.8 to 12.8 weight percent NBD (based on the weight of a mixture of diene and 1-hexene) added to the reactor with the results listed below. Comparative examples 33 and 34 are produced under similar conditions, but with no cyclic diene comonomer. Prior to testing, examples 15 to 19 in granular form are divided into two portions, one to remain as granular resin (A version in Table below) and one to be extrusion compounded (B version in Table below) prior to testing. Granular, or A versions, of examples 15 to 19, which are comparative examples, and comparative example 33 are each unstabilized prior to testing. B versions of examples 15 to 19 and comparative example 34 are each dry blended with 1500 ppm Irganox™ B-900 (Ciba) and compounded on a 1.5 inch Killion™ Extruder with a standard LLDPE mixing screw (30/1 length to diameter) at a rate of 40 pounds per hour (at about 90 rpm) with a set die temperature of 410 degrees F. It is shown that the unstabilized, granular comparative examples 15A to 19A have RSI, nRSI, and cRSI values that increase substantially and consistently with increasing NBD weight percent in 1-hexene fed to the reactor. More specifically, the unstabilized, granular comparative examples 15A to 19A have nRSI and cRSI values that are 2.3 to 350 times those for comparative example 33. It is additionally shown that the compounded, stabilized examples 15B to 19B have RSI, nRSI, and cRSI values that are well below those for each of their granular, unstabilized analogs. Further, it is shown that comparative example 34 has RSI, nRSI, and cRSI values that are about the same as those of its granular analog, comparative example 33. The nRSI and cRSI values for examples 15B to 17B suggest an inherent LCB structure that results from re-incorporation of the second double bond in the NBD structure during the reaction process. Further, it suggests that such a structure can be readily stabilized so as to resist additional chemical reactions, such as cross-linking, during extrusion compounding. Still further, examples 15B to 17B suggest that there is an optimal level of cyclic diene comonomer to be added to the reaction to maximize formation of LCB structures whereas additional cyclic diene comonomer addition could favor initial incorporation of the cyclic diene comonomer into a growing polymer chain rather than re-incorporation of second double bonds of cyclic diene comonomer that have already been incorporated. Additionally, the nRSI and cRSI values for comparative examples 15A to 19A suggest the extent to which residual unsaturation due to cyclic diene comonomer that has been incorporated once into growing polymer chains, but not re-incorporated to form LCB, can lead to undesired chemical reactions, such as cross-linking. See Table V.

TABLE V

| Examples | NBD (wt %) | MI | PDI | RSI | nRSI | cRSI |
|---|---|---|---|---|---|---|
| 33 | 0 | 1.8 | 3.0 | 2.9 | 4.1 | 1.1 |
| 15A | 0.8 | 4.0 | 3.1 | 4.4 | 10.2 | 2.6 |
| 16A | 1.6 | 2.7 | 3.0 | 5.2 | 9.6 | 2.6 |
| 17A | 3.2 | 1.3 | 3.4 | 24.2 | 28.3 | 6.5 |
| 18A | 6.4 | 0.3 | 3.1 | 269.8 | 131.9 | 34.6 |
| 19A | 12.8 | 0.5 | 2.7 | 2084.5 | 1314.2 | 393.8 |
| 34 | 0 | 2.0 | 3.1 | 2.7 | 4.1 | 1.1 |
| 15B | 0.8 | 4.1 | 3.1 | 2.9 | 6.8 | 1.8 |
| 16B | 1.6 | 3.7 | 3.0 | 3.5 | 7.8 | 2.1 |
| 17B | 3.2 | 2.9 | 3.4 | 7.3 | 14.0 | 3.2 |
| 18B | 6.4 | 1.6 | 3.1 | 2.3 | 3.0 | 0.8 |
| 19B | 12.8 | 2.6 | 2.7 | 2.8 | 5.0 | 15 |

Examples 20 to 28 are produced with up to 4.5 weight percent of NBD or VNB (based on the weight of a mixture of diene and 1-hexene) added to the reactor, with results listed below. Comparative example 35 is produced under similar conditions, but with no cyclic diene comonomer. Prior to testing, each of examples 20 to 22 are dry-blended with 1500 ppm of Irganox™ B-900 (Ciba) and pressed under non-severe conditions to promote dispersion without promoting any degradation in the samples. Also prior to testing, examples 23 to 28 and comparative example 35 are each dry blended with 1500 ppm IRGANOX™ B-900 (Ciba) and compounded on a 1.5 inch Killion™ extruder with a standard LLDPE mixing screw (30/1 length to diameter) at a rate of 40 pounds per hour ( about 90 rpm) with a set die temperature of 410 degrees. It is shown that RSI, nRSI, and cRSI values for example 21 are much higher than those for example 20, though both are produced with NBD. The higher NBD level in example 21 is found to have cross-linked during the reaction or subsequent treatment as indicated by an exceptionally low relaxation time that delineates very fast relaxation processes introduced into molecular segments between cross-links. Lower nRSI and cRSI values for example 22 relative to those for example 20 show that residual unsaturation resulting from the failure to re-incorporate any VNB monomer is less susceptible to undesired cross-linking than comparable levels of NBD. It is shown that examples 23 to 28 have RSI, nRSI, and cRSI values that are about the same as those for comparative example 35. The relatively low cyclic diene comonomer levels fail to provide adequate sites for the formation of LCB by re-incorporation of the second double bond of either cyclic diene comonomer such that the level of LCB is detected by rheological methods. Further, it is shown that any residual unsaturation resulting from the failure to re-incorporate either of the cyclic diene comonomers in examples 23 to 28 have been successfully stabilized. Examples 20 to 22 demonstrate that in spite of low re-incorporation, sufficient levels of comonomer have been incorporated to provide opportunities for desired cross-linking. See Table VI.

TABLE VI

| Examples | diene (wt %) | diene | MI | PDI | RSI | nRSI | cRSI |
|---|---|---|---|---|---|---|---|
| 20 | <0.6 | NBD | 0.9 | 2.8 | 17.6 | 15.9 | 4.6 |
| 21 | 2.3 | NBD | 1.6 | 3.2 | 181.0 | 242.0 | 59.4 |
| 22 | 1.7 | VNB | 3.7 | 2.3 | 4.8 | 10.6 | 3.9 |
| 35 | 0 | — | 1.0 | 2.4 | 3.0 | 3.0 | 1.0 |
| 23 | <0.6 | NBD | 0.8 | 2.8 | 3.2 | 2.9 | 0.8 |
| 24 | 0.6 | NBD | 0.9 | 2.7 | 3.5 | 3.2 | 1.0 |
| 25 | 0.9 | NBD | 2.4 | 2.6 | 1.8 | 3.1 | 1.0 |
| 26 | 2.3 | NBD | 1.6 | 3.0 | 2.2 | 3.0 | 0.8 |
| 27 | 1.4 | VNB | 1.3 | 3.0 | 3.2 | 3.7 | 1.0 |
| 28 | 1.7 | VNB | 1.0 | 2.9 | 2.7 | 2.7 | 0.8 |

Notes to Examples and Tables:
NBD = norbornadiene
C6 = 1-hexene
MI (g/10 min) = melt index in grams per 10 minutes in accordance with ASTM D1238, condition E, at 190 degrees C.
PDI = polydispersity index (Mw/Mn)
RSI = relaxation spectrum index is explained as follows: the breadth of the relaxation spectrum defined by the ratio of its first and second moments
nRSI = the n version of the RSI is explained as follows: RSI $\cdot$ MI$^a$, when a is about 0.6
cRSI = the c version of the RSI is explained as follows: RSI $\cdot$ MI$^a$ $\cdot$ PDI$^b$, when a and b are about 0.6 and minus 1.2, respectively
Ea (kcal per mol) = flow activation energy in kilocalories per mol
VNB = vinyl norbornene
ENB = ethylidene norbornene
longest relaxation time (sec) = time value associated with the longest discrete relaxation in relaxation spectrum

What is claimed is:

1. A polymer comprising the comonomers ethylene, one or more alpha-olefins having 3 to 20 carbon atoms, and one or more cyclic dienes having up to 30 carbon atoms, said polymer having a density of at least 0.890 gram per cubic centimeter; stabilized double bonds; long chain branching; an Mw/Mn ratio (PDI) of at least about 2.5; a flow activation energy of greater than about 6.5 kcal/mol; and a Relaxation Spectrum Index (RSI), PDI, and Melt Index (MI), such that RSI×MI$^a$>2.7 and RSI×MI$^a$×PDI$^b$ is in the range of about 0.8 to about 60, when a and b are about 0.6 and minus 1.2, respectively, with the provisos that (i) the concentration of stabilized double bonds is about 0.01 to about 3 percent by weight based on the weight of the polymer and (ii) the PDI is no greater than the PDI, which will result in an RSI× MI$^a$×PDI$^b$ less than about 0.8.

2. The polymer defined in claim 1 wherein the polymer is a terpolymer.

3. The polymer defined in claim 1 wherein the alpha-olefin has 3 to 20 carbon atoms and the cyclic diene has up to 9 carbon atoms.

4. The polymer defined in claim 1 wherein the density of the polymer is in the range of 0.89 to 0.965 gram per cubic centimeter.

5. The polymer defined in claim 1 wherein the Mw/Mn ratio is in the range of about 3 to about 10.

6. The polymer defined in claim 1 wherein the flow activation energy is greater than about 7.5 kcal/mol.

7. The polymer defined in claim 1 wherein the Relaxation Spectrum Index (RSI) and Melt Index (MI) are such that RSI×MI$^a$>3.0 when a is about 0.6.

8. The polymer defined in claim 6 wherein the Relaxation Spectrum Index (RSI), PDI, and Melt Index (MI), are such that RSI×MI$^a$×PDI$^b$ is in the range of about 1.1 to about 35, when a and b are about 0.6 and minus 1.2, respectively.

9. A terpolymer comprising the comonomers ethylene, an alpha-olefin having 3 to 20 carbon atoms, and a cyclic diene having up to 30 carbon atoms, said polymer having a density in the range of 0.890 to 0.965 gram per cubic centimeter; stabilized double bonds; long chain branching; an Mw/Mn ratio ratio (PDI) of about 2.5 to about 10; a flow activation energy of greater than about 6.5 kcal/mol; and a Relaxation Spectrum Index (RSI), PDI, and Melt Index (MI), such that $RSI \times MI^a > 2.7$ and $RSI \times MI^a \times PDI^b$ is in the range of about 0.8 to about 60, when a and b are about 0.6 and minus 1.2, respectively, with the provisos that (i) the concentration of stabilized double bonds is about 0.01 to about 3 percent by weight based on the weight of the polymer and (ii) the PDI is no greater than the PDI, which will result in an $RSI \times MI^a \times PDI^b$ less than about 0.8.

10. The terpolymer defined in claim 9 wherein the alpha-olefin is 1-butene, 1-hexene, 1-octene, or 4-methyl-2-pentene and the cyclic diene is norbornadiene, vinyl norbornene, or ethylidene norbornene.

11. The terpolyner defined in claim 9 wherein the concentration of double bonds is about 0.01 to about 3 weight percent.

* * * * *